(12) United States Patent  
Matsumoto

(10) Patent No.: US 8,085,706 B2
(45) Date of Patent: Dec. 27, 2011

(54) WIRELESS COMMUNICATION METHOD AND APPARATUS

(75) Inventor: Masato Matsumoto, Yokohama (JP)

(73) Assignee: DENSO CORPORATION, Kariya (JP)

( * ) Notice: Subject to any disclaimer, the term of this patent is extended or adjusted under 35 U.S.C. 154(b) by 990 days.

(21) Appl. No.: 12/068,677

(22) Filed: Feb. 11, 2008

(65) Prior Publication Data

US 2008/0291889 A1    Nov. 27, 2008

(30) Foreign Application Priority Data

Feb. 13, 2007  (JP) ................ 2007-032238

(51) Int. Cl.
    H04B 7/212    (2006.01)
    H04W 4/00     (2009.01)
    G06F 15/16    (2006.01)

(52) U.S. Cl. ........ 370/322; 370/329; 370/348; 709/228; 709/229; 455/422.1

(58) Field of Classification Search ............. 370/348
    See application file for complete search history.

(56) References Cited

U.S. PATENT DOCUMENTS

| 7,245,604 B2 * | 7/2007 | Benveniste | 370/338 |
| 7,653,023 B2 * | 1/2010 | Famolari | 370/329 |
| 2002/0181417 A1 * | 12/2002 | Malhotra et al. | 370/329 |
| 2005/0002364 A1 * | 1/2005 | Ozer et al. | 370/338 |
| 2006/0114851 A1 * | 6/2006 | Gupta et al. | 370/329 |
| 2007/0041398 A1 * | 2/2007 | Benveniste | 370/448 |
| 2007/0280187 A1 * | 12/2007 | Wang et al. | 370/338 |

FOREIGN PATENT DOCUMENTS

| JP | A-H7-321789 | 12/1995 |
| JP | A-2000-269993 | 9/2000 |
| JP | A-2005-244840 | 9/2005 |
| JP | A-2005-51521 | 11/2005 |
| JP | A-2005-311885 | 11/2005 |
| JP | A-2006-197177 | 7/2006 |

OTHER PUBLICATIONS

Office Action dated Jan. 6, 2009 in corresponding JP application No. 2007-032238 (and English Translation).
Office Action dated Aug. 25, 2009 from Japan Patent Office in corresponding JP application No. JP-2007-032238 (and English translation).

* cited by examiner

Primary Examiner — Andrew Chriss
(74) Attorney, Agent, or Firm — Posz Law Group, PLC

(57) ABSTRACT

A wireless communication method and apparatus for the same performs access control in the following manner, where an acquisition of a right to transmit is performed by CSMA access control method, and a collision of transmitted data packets among different communication apparatuses is prevented for facilitating a stable transmission of data packets from each of the apparatuses in a predetermined interval. The transmission of a data packet having a predetermined data length under a cyclical access control sets an access control start time at a time that is after a lapse of predetermined amount of time from the previous acquisition of the right to transmit. As a result, the competition of the right to transmit is resolved due to a different access control start time set for the next transmission.

30 Claims, 7 Drawing Sheets

| VEHICLE ID | RECEPTION END TIME | POS | SPD | PAIR FLAG |
|---|---|---|---|---|
| 1 | TE1 | P1 | V1 | ON |
| 2 | TE2 | P2 | V2 | OFF |
| . | . | . | . | . |
| . | . | . | . | . |
| . | . | . | . | . |
| n | TEn | Pn | Vn | OFF |

ND APPARATUS

CROSS REFERENCE TO RELATED APPLICATION

This application is based on and claims the benefit of priority of Japanese Patent Application No. 2007-32238 filed on Feb. 13, 2007, the disclosure of which is incorporated herein by reference.

FIELD OF THE DISCLOSURE

The present invention generally relates to a wireless communication method and apparatus for obtaining a right to transmit by CSMA access control and starting a data packet transmission.

BACKGROUND INFORMATION

A wireless communication method has been known in which access control based on CSMA is performed to obtain a right to transmit by carrier sensing and, when a right to transmit is obtained, a data packet transmission is started.

For access control, methods in which the probability of collision between data packets transmitted by an own communication device/apparatus (i.e., a subject apparatus) and other communication devices/apparatuses is reduced as much as possible are known. Such methods of access control include, for example, access control based on p-persistent CSMA in which a data packet transmission is started when a collision avoidance time determined based on a probability p elapses after an uncongested state of the wireless channel to be used is detected by carrier sensing and access control based on CSMA/CA complying with the IEEE802.11 standard in which backoff control is started when a predetermined amount of time elapses after an uncongested state of the wireless channel to be used is detected by carrier sensing and in which carrier sensing is continued during a randomly determined collision avoidance time.

A communication device which performs such access control based on CSMA sets an access control start time or data packet collision avoidance time autonomously without regard to other communication devices, so that, when there are more communication devices to use a same wireless channel, there is a higher probability of the access control start time or data packet collision avoidance time coinciding with different communication devices.

When CSMA access control is used, therefore, it is not possible to prevent, certainly, transmission packets transmitted by plural communication devices from colliding with one another, so that there have been cases where the number of data packet transmissions cannot be evenly distributed among communication devices.

To solve such a problem, a method of evenly distributing the number of transmissions among the communication devices has been proposed (see Japanese patent document JP-A-2005-311885, for example) in which the time from when each communication device successfully completes a data packet transmission to when the communication device next obtains a right to transmit by access control is measured as the transmission waiting time of the communication device and the number of data packets the communication device is allowed to transmit based on the obtained right to transmit is determined based on the measured transmission waiting time.

In the proposed wireless communication method, when a communication device is unable to transmit a data packet on an occasion, the number of data packets the communication device is allowed to transmit on the next occasion is increased, so that the volumes of data transmitted by plural communication devices are eventually averaged. Thus, the method is not for preventing collisions between data packets transmitted by plural communication devices. It is not, therefore, possible, using the method, to average the data packet transmission intervals among plural communication devices and allow each of the communication devices to carry out a transmission at a constant period.

Thus, the proposed method can be applied to a system in which each communication device is required to transmit a large volume of data divided into many packets, but it cannot be applied to a system in which each communication device is required to periodically transmit varying control data without involving any delay in responses.

SUMMARY OF THE DISCLOSURE

The present invention has been made in view of the above and other problems, and an object of the invention is to provide a wireless communication method and device for obtaining a right to transmit by CSMA access control and starting a data packet transmission, and the wireless communication method and device/apparatus making it possible to prevent collisions between data packets transmitted from plural communication devices/apparatuses so that the plural communication devices/apparatuses can periodically and stably transmit data packets.

In the wireless communication method of the present invention is intended to achieve the above object, that is, an access control based on CSMA is performed and, when a right to transmit is obtained by the access control, a constant-length data packet is transmitted; and a time to be reached when a constant amount of time elapses after a right to transmit was last obtained by the access control is set as a next access control start time.

Namely, in cases where plural communication devices cyclically transmit incessantly varying control data to allow the latest control data to be shared by the plural control devices included in the plural communication devices, it is a general approach to make each of the plural communication devices transmit control data at a constant period.

In access control based on CSMA, each communication device can be made to transmit a data packet at a constant period by setting access control start times at uniform intervals.

In such an arrangement, however, when the access control start time coincides with plural communication devices, they subsequently repeat starting access control at approximately the same time. This increases the probability of collisions between transmission packets transmitted by the plural communication devices.

In an attempt to avoid such packet collisions between communication devices coinciding in access control start time, an arrangement may be made such that a communication device can start a data packet transmission when a random amount of collision avoidance time elapses after an uncongested state of the wireless channel is detected by access control as provided in access control based on p-persistent CSMA or in access control based on CSMA/CA complying with the IEEE802.11 standard. Even with such an arrangement, however, collision avoidance times set for plural communication devices can coincide to cause collisions between data packets transmitted by the plural communication devices.

In the invention, times when to start access control based on CSMA are not set at uniform intervals, but the access control start time for a communication device is set to be a constant amount of time after a start of a data packet transmission by the communication device after obtaining a right to transmit. In this way, the access control start time intervals are varied between communication devices based on the time that each of the communication devices has taken to obtain a right to transmit by the access control performed lastly.

Thus, in the invention, even after access control is started substantially simultaneously by plural communication devices, when the plural communication devices are caused, by the access control, to perform data packet transmissions at different times, they are caused to start next access control also at different times.

Thus, the invention makes it possible to remove causes of collisions between data packets transmitted by plural communication devices and allow the plural communication devices to periodically transmit data packets, respectively.

In the wireless communication method of the invention, the access control based on CSMA is performed at a predetermined period and, when a right to transmit is obtained by the access control, a constant-length data packet is transmitted as in the method described above; during the access control, the number of data packet transmissions made by other communication devices or the amount of time taken for data packet transmissions made by other communication devices is counted by carrier sensing; and, when the number of data packet transmissions or the amount of time counted exceeds a first check value, the access control is halted.

When it takes long to obtain a right to transmit after starting access control, it is considered that the communication traffic over the target wireless channel is currently heavy. Hence, in the invention, whether a wireless channel is congested or not is determined based on the number of data packet transmissions or the amount of time taken for data packet transmissions made by other communication devices during the access control. When the wireless channel is determined to be congested, the access control is halted.

When the access control is halted as described above, a time period during which the wireless channel is not congested and a data packet can be transmitted (in other words, a time period during which the communication traffic over the wireless channel is not heavy) is detected based on the condition of data packet reception from other communication devices, and a time that is after a predetermined amount of time from the start of the detected time period is set as the next access control start time.

Therefore, even if the access control is once halted as described above, when access control is started next, the wireless channel is not congested, so that a data packet transmission can be started by quickly obtaining a right to transmit.

After a data packet transmission is made as described above, the access control start time for the communication device is set to start access control at a period equal to the predetermined amount of time, so that the communication device can subsequently transmit data packets by starting access control when the communication traffic over the wireless channel is not heavy.

Hence, in the wireless communication method of this invention, too, it is possible to remove causes of collisions between data packets transmitted by plural communication devices and allow the plural communication devices to periodically transmit data packets, respectively.

In the wireless communication method of the invention according, access control based on CSMA is performed at a predetermined period and, when a right to transmit is obtained by the access control, a constant-length data packet is transmitted as in above described methods. Furthermore, separately from the above sequence of processes, the ratio of time taken for data packet transmissions made by other communication devices during a predetermined period during which the access control is continued (in other words, the degree of congestion of the wireless channel) is calculated.

When the ratio of time thus calculated exceeds a second check value, one of the other communication devices from which data packets were received during the predetermined period is selected as the counterpart device (i.e. paired apparatus) of pair communication. Subsequently, during the time until a right to transmit is obtained by access control, the next access control start time of the counterpart device is forecasted based on the time when a data packet was received last from the counterpart device and the forecast time is set as the next access control start time of the own device.

Namely, in the invention, whether the wireless channel is congested or not is determined based on the time ratio calculation and, when the wireless channel is congested, the access control start time is set to be approximately the same as that of the one of the communication devices (that is, the counterpart communication device) causing the own communication device to compete with the counterpart communication device for a right to transmit.

When the own communication device wins the competition obtaining a right to transmit before the counterpart communication device, the own communication device gives an order to start pair communication to the counterpart device by sending a data packet including pair information which indicates that pair communication is to be performed between the own device and the counterpart device. Subsequently, pair communication is performed between the own communication device and the counterpart device with the subsequent access control start times set at intervals of two times the predetermined period of time, allowing the two devices to obtain a right to transmit alternately at the predetermined period.

In the invention, when a data packet received, while pair communication is not performed, from another communication device includes pair information indicating that pair communication is to be performed with the own communication device: the communication device from which the data packet was transmitted is recognized as the counterpart device of pair communication; the next data packet transmission is canceled by halting the access control; the time that is reached when the predetermined period of time elapses from when the communication device recognized as the counterpart device started the data packet transmission is forecasted based on the time when the data packet was received from the counterpart device; the forecast time is set as the next access control start time; and pair communication is performed with the subsequent access control start times set at intervals of two times the predetermined period of time.

Hence, according to the invention, when the wireless channel to be used is excessively congested, a communication device which is going to start transmitting data packets and another communication device which is already engaged in data packet transmission can be paired and they can then alternately transmit a data packet, each of them transmitting at a period two times a normal period.

Thus, the invention can prevent the occurrence of a state in which, with the communication traffic over the wireless channel to be used having grown too heavy, data transmitted from plural communication devices collide and the communication devices become unable to transmit data packets. Namely, in the present invention, it is possible to remove causes of collisions between data packets transmitted by plural communication devices and allow the plural communication devices to periodically transmit data packets, respectively.

The methods described above may be implemented to a wireless communication apparatus for performing wireless communication of the above-described methods thereby achieving the same advantageous effect.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention will be described below with reference to the drawings.

First Embodiment

Figure 1:
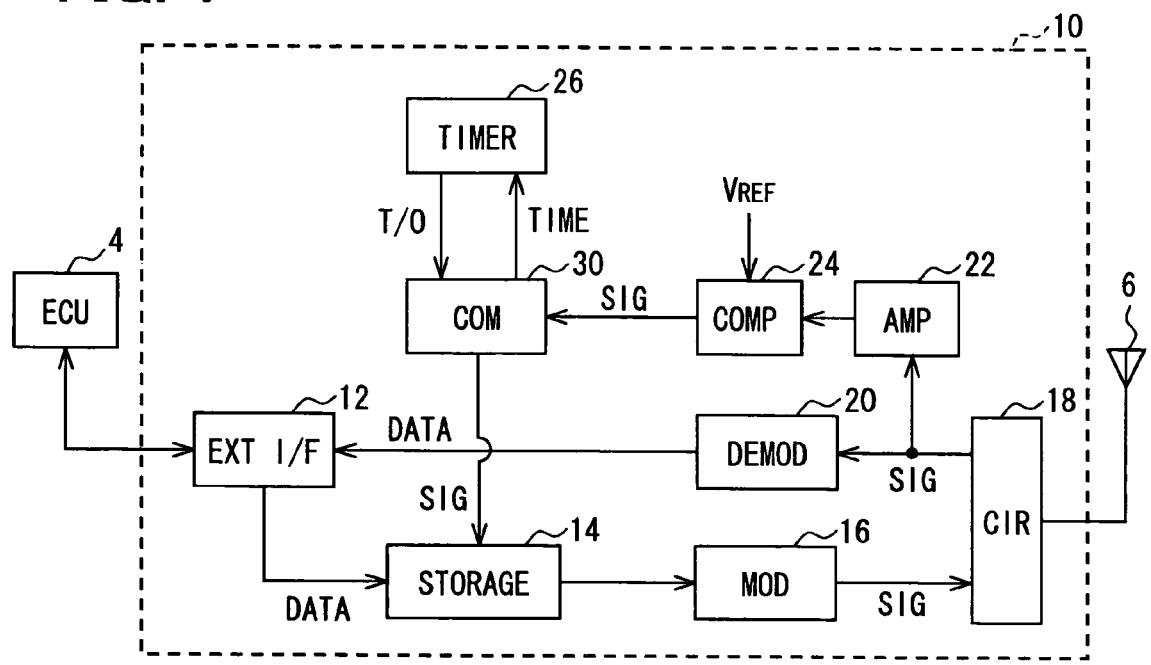
FIG. 1 shows a block diagram of configuration of a wireless communication device in a first embodiment of the present invention.

FIG. 1 is a block diagram showing the configuration of a wireless communication device according to a first embodiment of the present invention.

A wireless communication device (hereinafter referred to simply as the "communication device") 10 of the present embodiment is used, mounted on an automobile, to carry out vehicle-to-vehicle broadcast-type communication.

Namely, the communication device 10 obtains information on the state of its own vehicle (for example, information on various conditions including location and speed) from an electronic control unit (ECU) 4 and periodically transmits the information obtained to an area around the own vehicle via an antenna 6, whereas receiving, via the antenna 6, signals transmitted from surrounding vehicles, detecting the states of the surrounding vehicles based on the received signals, and communicating the detected states to the ECU 4.

The communication device 10 is provided with: an external interface (external I/F) 12 used to exchange information with the ECU 4, the information including information (transmission data) on the conditions of the own vehicle and information (received data) obtained from the surrounding vehicles; a transmission packet storage device 14 which stores the transmission data obtained from the ECU 4 via the external I/F 12 and, when a transmission order signal is inputted from a microcomputer 30 for communication control, outputs the stored transmission data as a data packet (transmission packet) of a constant length; a modulator 16 which converts the transmission packet outputted from the transmission packet storage device 14 into a transmission signal for wireless transmission; a demodulator 20 which demodulates the information (received data) received from other vehicles based on the signal received via the antenna 6 and outputs the received data to the ECU 4 via the external I/F 12; and a circulator 18 which outputs the transmission signal coming from the modulator 16 to the antenna 6 and also outputs the received signal inputted from the antenna 6 to the demodulator 20.

The communication device 10 is designed to exchange data packets of a constant length with communication devices 10 of other vehicles using a common wireless channel. It starts a data packet transmission when a right to transmit is obtained by access control based on CSMA.

The communication device 10 is provided with a comparator 24. The comparator 24 takes out, via a log amplifier 22, part of the received signal inputted from the circulator 18 to the demodulator 20 and determines, based on whether the signal level of the received signal exceeded a predetermined reference voltage, whether the received signal contains a transmission signal (carrier) from another vehicle. When the received signal is determined to contain a transmission signal from another vehicle, the comparator 24 generates a high-level carrier sense signal (CS signal).

The CS signal is inputted to the microcomputer 30. The microcomputer 30, by setting an access control start time on a clock timer 26, periodically performs access control to obtain a right to transmit over a wireless channel based on the CS signal. When a right to transmit is obtained by access control, the microcomputer 30 outputs a transmission order signal to the transmission packet storage device 14 and thereby makes the transmission packet storage device 14 start transmitting a transmission packet.

The control process that the microcomputer 30 performs, as described above, to periodically transmit a transmission packet to an area around the own vehicle will be explained below.

Figure 2:
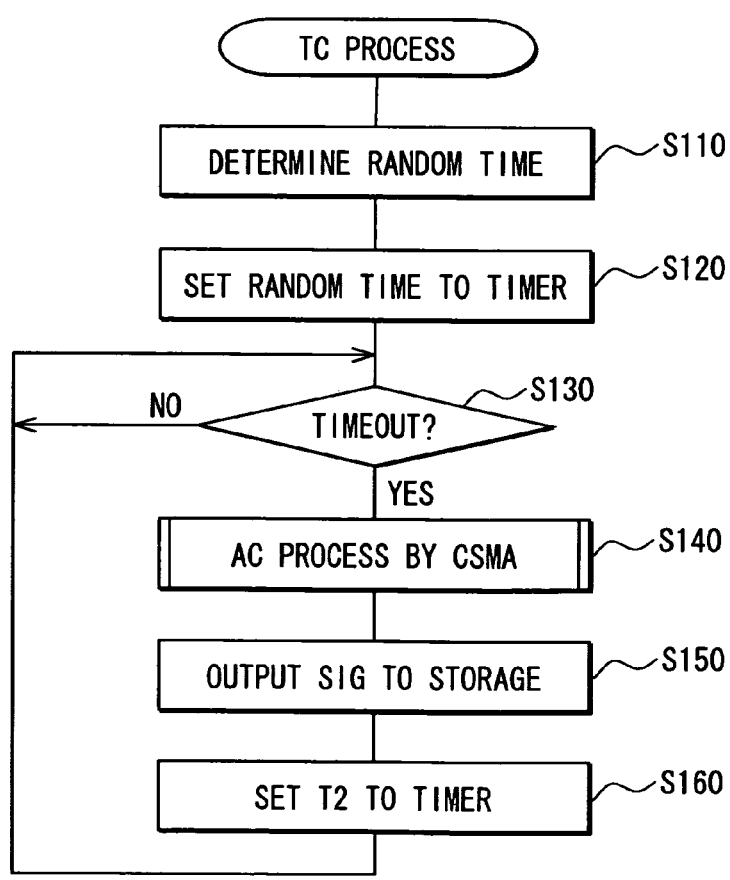
FIG. 2 shows a flowchart of a transmission control process in the first embodiment.

FIG. 2 is a flowchart showing the transmission control process repeatedly performed by the microcomputer 30, for example, while the engine of the vehicle is running.

As shown in FIG. 2, when the transmission control process is started, first in Step S110, a random amount of time not exceeding a predetermined period is determined. For example, when the predetermined period is 100 ms, a random amount of time in ms in the range of 0 ms to 100 ms is determined.

Subsequently in Step S120, the random amount of time determined in Step S110 is set on the timer 26 to make the timer 26 count the random amount of time. In Step S130, whether or not an access control start time has been reached is determined by checking whether a time-out (T/O) notification has been received from the timer 26.

When it is determined in Step S130 that the access control start time has been reached, processing advances to Step S140 and an access control process based on CSMA is performed. When a right to transmit is obtained by performing the access control process in Step S140, processing advances to Step S150 where a transmission order signal is outputted to the transmission packet storage device 14 and a transmission packet transmission from the communication device 10 is started.

In Step S160, a predetermined constant amount of time T2 is set on the timer 26 so that the access control process next starts when the constant amount of time T2 elapses after a transmission packet started being transmitted based on the right to transmit last obtained by the access control process. Processing then returns to Step S130.

Subsequently, Steps S130 through S160 are repeatedly executed to periodically transmit a transmission packet at a period of the sum of the amount of time that was taken to obtain the right to transmit by the access control process performed in Step S140 and the constant amount of time T2.

Figure 3:
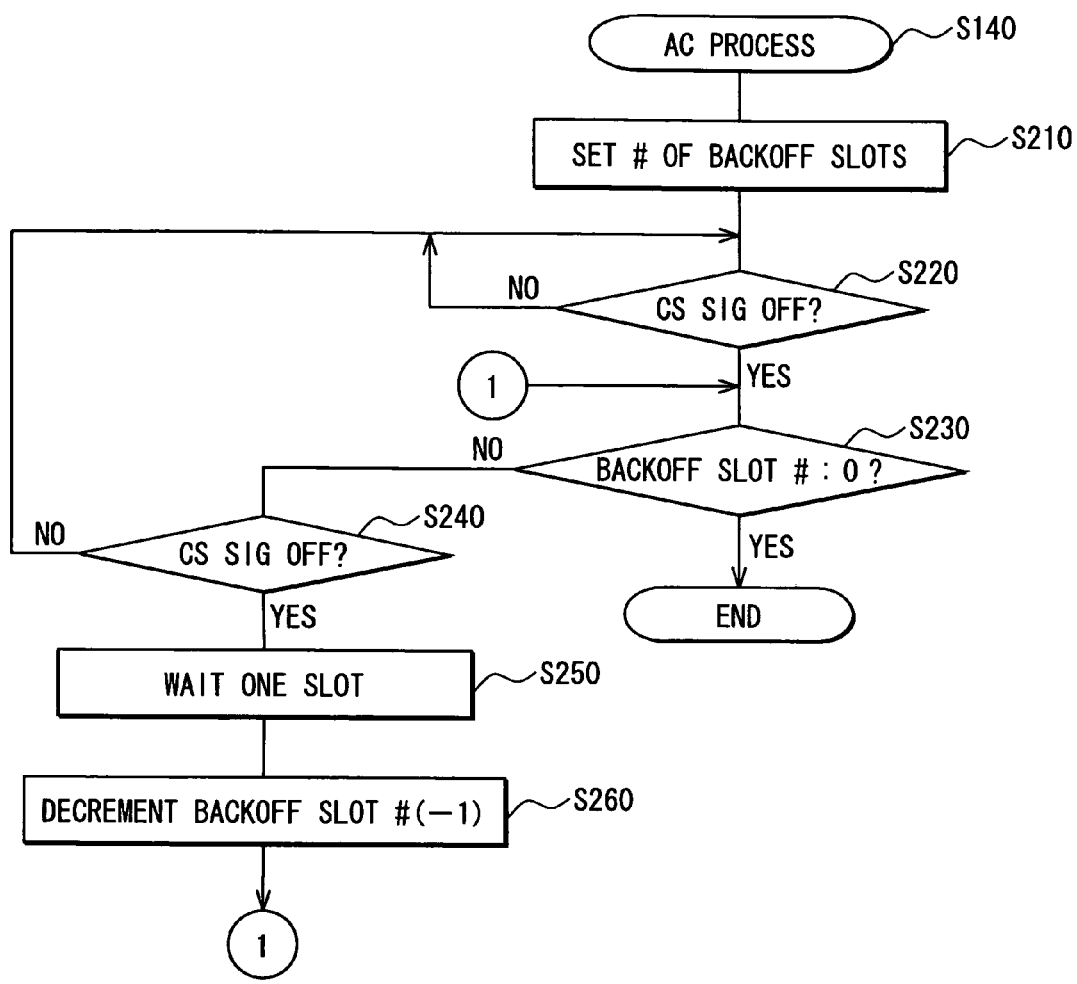
FIG. 3 shows a flowchart of access control process in the first embodiment.

FIG. 3 is a flowchart showing the access control process executed in Step S140.

In the access control process as shown in FIG. 3, a random value called the number of backoff slots is selected from a predetermined range of numbers (0 to 15 in the present embodiment) in Step S210.

In Step S220, whether the wireless channel is idle, that is, available for use or busy, that is, being used by another vehicle is determined by checking whether the CS signal inputted from the comparator 24 is low (OFF) or high (ON).

When the CS signal is ON, the determination process of Step S220 is performed again to wait for the wireless channel to become idle. When the CS signal turns OFF indicating that the wireless channel has become idle, the program advances to Step 230 to determine whether or not the number of backoff slots is 0.

When it is determined in Step S230 that the number of backoff slots is 0, it is determined that a right to transmit over the wireless channel has been obtained and the access control process is terminated. Conversely, when it is determined in Step S230 that the number of backoff slots is not 0, processing advances to Step S240 and whether or not the CS signal is OFF is determined as in Step S220.

When it is determined in Step S240 that the CS signal is not OFF, processing returns to Step S220 to wait for the CS signal to become OFF (a state where the wireless channel is idle). When it is determined in Step S240 that the CS signal is OFF (a state where the wireless channel is idle), processing advances to Step S250.

In Step S250, elapsing of a preset amount of time which corresponds to one backoff slot is awaited. When the waiting process is terminated, one is decremented from the number of backoff slots to update the number in Step S260. Processing then returns to Step S230.

Namely, in the access control process of the present embodiment, whether or not the wireless channel is idle is determined based on the CS signal. When it is determined that the wireless channel is idle, whether or not the idle state has lasted as long as or longer than the wait time determined by the number of backoff slots is determined. When the idle state is determined to have lasted as long as or longer than the wait time, it is determined that a right to transmit has been obtained and transmission of a transmission packet is started.

As described above, in the communication device 10 of the present embodiment, when a right to transmit is obtained by performing the access control process shown in FIG. 3 and a transmission packet starts being transmitted, a constant amount of time T2 is set on the timer 26 so that, when the constant amount of time T2 elapses from when the right to transmit was obtained by performing the access control process, the next access control process is started.

Thus, compared with cases where an access control process is performed at a constant period T1 to periodically transmit a transmission packet, the present embodiment makes it possible to prevent collisions between transmission packets transmitted from the communication devices 10 of different vehicles or prevent competition for a right to transmit between the communication devices 10 of different vehicles.

Figure 4A:
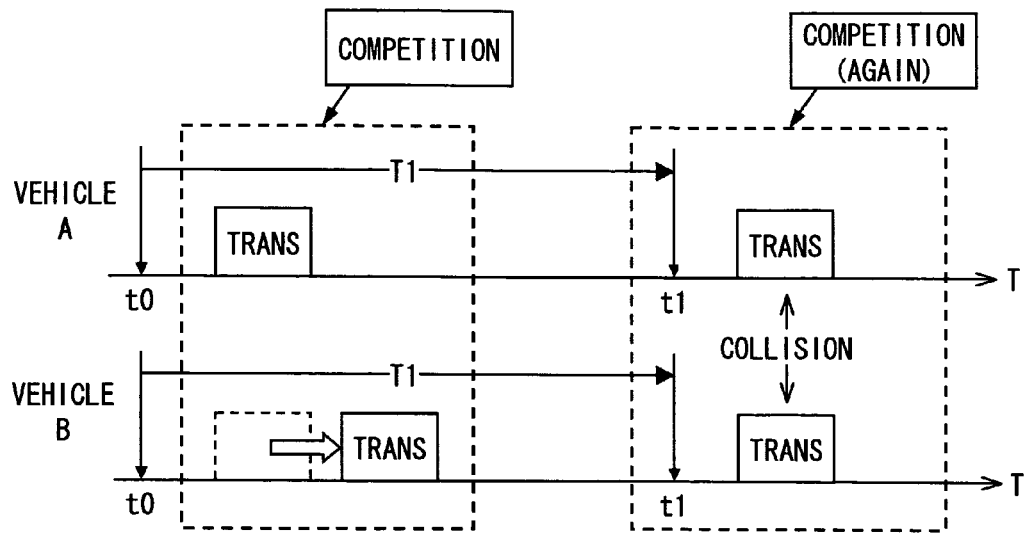
FIGS. 4A and 4B respectively show a timing chart of the access control in the first embodiment.

In a case as shown in FIG. 4A where an access control process is performed uniformly at a constant period T1, once an access control start time is set to be approximately the same (at time t0) between plural vehicles A and B located close to each other, subsequently the vehicles A and B repeatedly start access control approximately simultaneously (at time t1, or other timing), so that competition for a right to transmit occurs between the vehicles A and B every time they start access control. This may even cause the number of backoff slots to coincide between the vehicles A and B, causing the vehicles A and B to each transmit a transmission packet approximately at the same time.

Figure 4B:
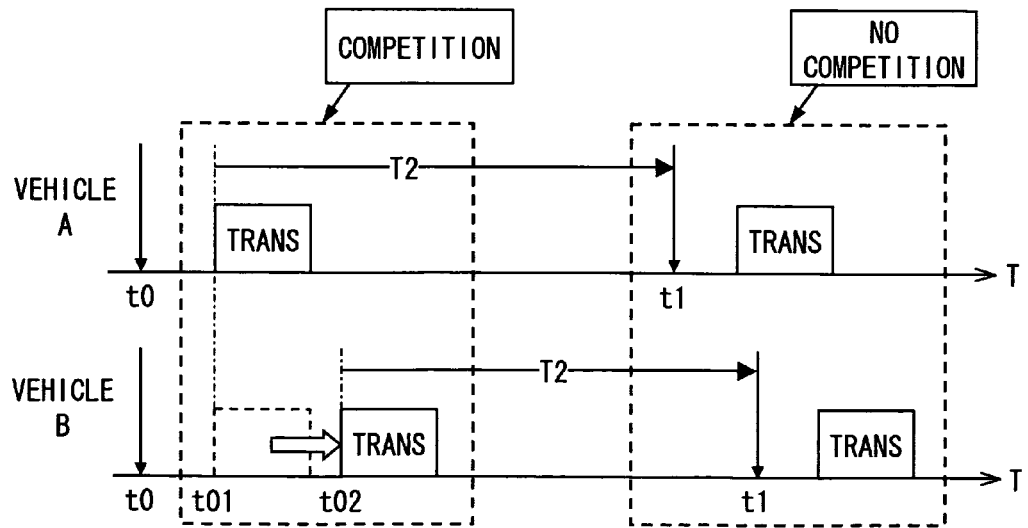

In the present embodiment as shown in FIG. 4B, however, even if an access control start time is set to be approximately the same (at time t0) between plural vehicles A and B, the time (t1) when to start the next access control is determined for each of the vehicles A and B by adding a constant amount of time (T2) to the time (t01 for the vehicle A, or t02 for the vehicle B) when each of the vehicles A and B started transmitting a data packet based on the right to transmit obtained by the last access control. In this way, it is possible to prevent competition for a right to transmit between the vehicles A and B or collision between data packets transmitted from the vehicles A and B.

Hence, mounting the communication device 10 of the present embodiment on each of the vehicles to engage in vehicle-to-vehicle communication will enable stable communication between the vehicles.

In the present embodiment, if the time taken to obtain a right to transmit by performing the access control exceeds the constant amount of time T2, collisions between transmission packets become possible. The access control process execution time is, therefore, restricted to be shorter than the constant amount of time T2, that is, the minimum interval between packet transmissions.

In the present embodiment, the modulator 16 and demodulator 20 combined are conceptually equivalent to a transceiver unit of the present invention. Similarly, the comparator 24 is equivalent to a carrier sense unit of the invention. The transmission order signal output process performed in Step S150 shown in FIG. 2 and the transmission packet storage device 14 that transmits a transmission packet responding to a transmission order signal combined are equivalent to a transmission control unit of the invention. The access control process performed in Step S140 shown in FIG. 2 is equivalent to an access control unit of the invention. The process performed in Step S160 shown in FIG. 2 to set a constant amount of time T2 on the timer 26 is equivalent to an access control time set unit of the invention.

Second Embodiment

Figure 5:
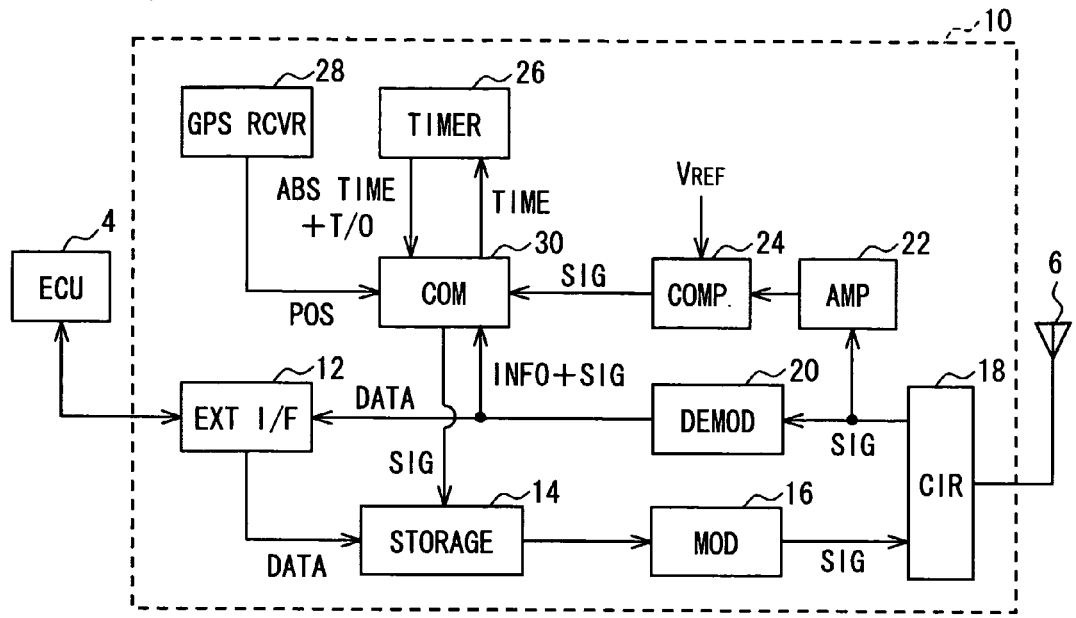
FIG. 5 shows a block diagram of configuration of the wireless communication device in a second embodiment.

FIG. 5 is a block diagram showing the configuration of a wireless communication device (communication device 10) according to a second embodiment of the present invention.

As shown in FIG. 5, the communication device 10 of the second embodiment is configured approximately similarly to the communication device 10 of the first embodiment. The second embodiment differs from the first embodiment in that the second embodiment includes a GPS receiver 28 capable of detecting the location and speed of the own vehicle based on the radio waves received from a satellite, that the timer 26 is capable of counting absolute time, and that the microcomputer 30 uses, in performing a transmission control process, information on the location and speed of the own vehicle detected by the GPS receiver 28, the absolute time counted by the timer 26, and the received data demodulated by the demodulator 20.

Figure 6:
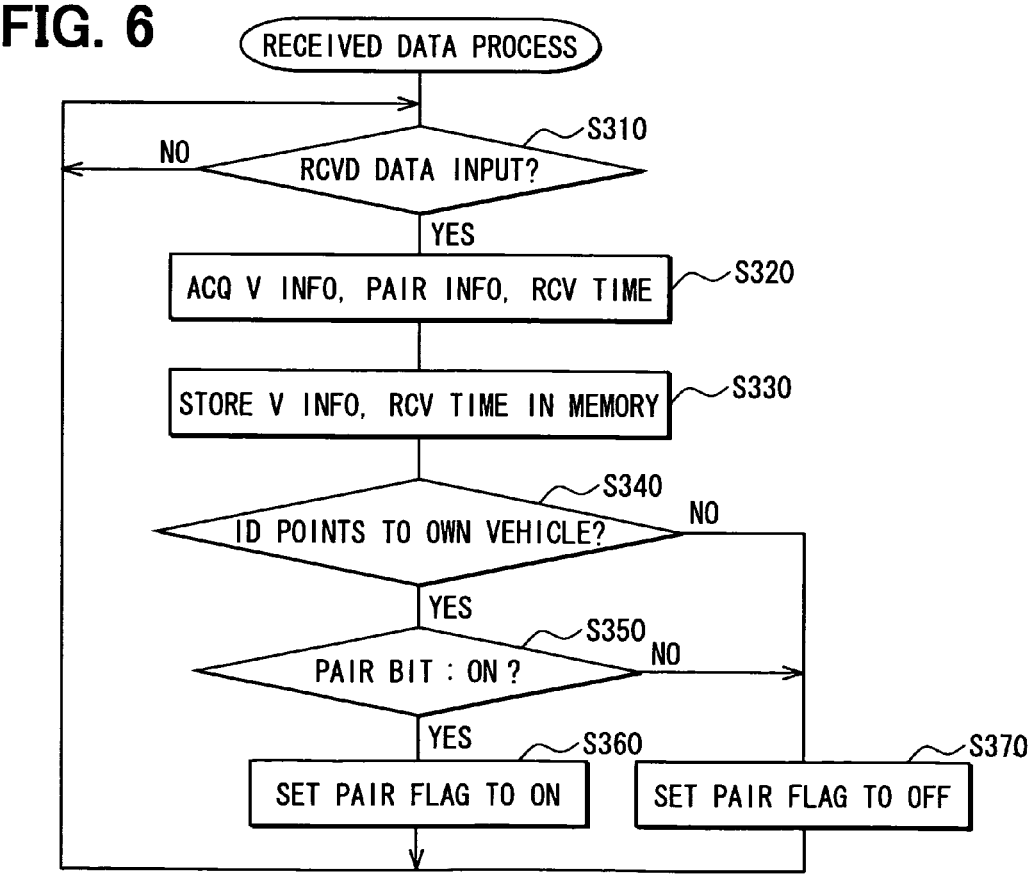
FIG. 6 shows a flowchart of a received data process in the second embodiment.

Namely, the microcomputer 30 first performs, separately from the transmission control process, the received data process shown in FIG. 6.

In the received data process, whether or not the received data has been inputted from the demodulator 20 is checked in Step S310 repeatedly until the received data is demodulated by the demodulator 20. When it is determined that the received data has been inputted from the demodulator 20, processing advances to Step S320. In Step S320, out of the received data, vehicle information representing the vehicle ID, location and speed of the vehicle from which the received data was transmitted and pair information is obtained. At the same time, the time when reception of the data packet ended is obtained from the timer 26 based on the reception completion signal outputted by the demodulator 20 upon completion of the reception of the data packet.

The pair information is the information that, when the vehicle having transmitted the last data packet is to engage in pair communication, the vehicle transmits to specify another vehicle to be the counterpart vehicle of pair communication. The pair information includes the ID of the counterpart vehicle and bit data (pair bit) indicating whether or not pair communication is to be carried out.

In pair communication, access control is performed alternately between two vehicles (to be more precise, between two communication devices 10), each vehicle performing access control at a period two times a normal period, so that the two vehicles can exchange data packets by alternately obtaining a right to transmit.

Figures 7, 8:
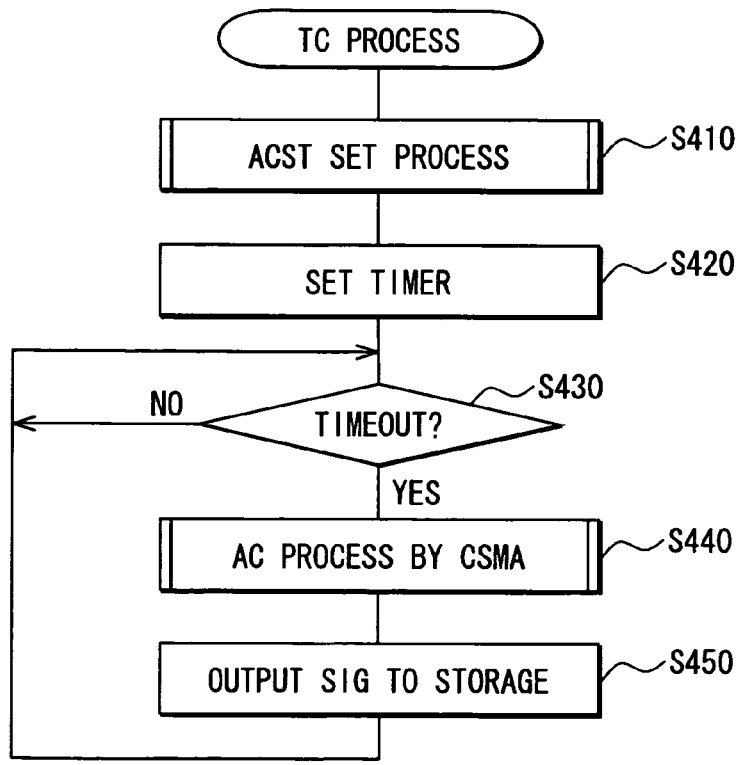
FIG. 7 shows a diagram of surrounding vehicle information memorized by the received data process of FIG. 6.
FIG. 8 shows a flowchart of the transmission control process in the second embodiment.

In Step S330, the vehicle information and the reception end time information obtained in Step S320 is stored in memory. Processing then advances to Step S340. In addition to the vehicle information (on the vehicle ID, location, and speed) and the reception end time information obtained as described above, the memory can also store, as shown in FIG. 7, a pair flag. The pair flag indicates whether or not the pair information specifying the own vehicle as the counterpart of pair communication was also received from the vehicle from which the vehicle information was received.

In Step S340, whether or not the pair vehicle ID included in the pair information obtained in Step S320 is the ID of the own vehicle is determined. When it is determined that the pair vehicle ID is the own vehicle ID, processing advances to Step S350 and whether or not the pair bit is ON (set to 1) is determined.

When it is determined in Step S350 that the pair bit is ON, processing advances to Step S360 and the pair flag in the memory is turned on to allow pair communication with the vehicle from which the vehicle information was received to be started or continued. Processing then returns to Step S310.

When it is determined in Step S340 that the pair vehicle ID included in the pair information is not the own vehicle ID, or when it is determined in Step S350 that the pair bit is OFF (set to 0), there is no need to engage in pair communication with the vehicle from which the vehicle information was received, so that the pair flag in the memory is turned OFF in Step S370. Processing then returns to Step S310.

Thus, in the received data process, the surrounding vehicle information (see FIG. 7) is generated. The surrounding vehicle information includes the vehicle information identifying the surrounding vehicles with which data communication can be carried out, the reception end time information indicating when the last data reception from each of the surrounding vehicles ended, and the pair flags indicating the surrounding vehicles from which a notice of starting or continuing pair communication was received.

FIG. 8 is a flowchart showing the transmission control process carried out by the microcomputer 30 of the present embodiment.

As shown in FIG. 8, in the transmission control process of the present embodiment, an access control start time (ACST) setting process is performed in Step S410. In Step S420, the access control start time set in Step S420 is set on the timer 26.

In Step S430, arrival of the access control start time is awaited by checking whether or not a time-out notification has been received from the timer 26. When it is determined in Step S430 that the access control start time has arrived, an access control process based on CSMA is performed in Step S440. When a right to transmit is obtained by performing the access control process in Step S440, processing advances to Step S450. In Step S450, a transmission order signal is outputted to the transmission packet storage device 14 and the communication device 10 is made to start a packet transmission. Processing then returns to Step S410.

In the access control process of the present embodiment compared with the access control process of the first embodiment shown in FIG. 3, additional functions equivalent to the functions of the first and third determination means of the present invention are used, so that when, during execution of the access control process, the number of data packets transmitted from other vehicles increases beyond a certain extent or a request to start pair communication is received from another vehicle, the access control process is halted.

Figure 9:
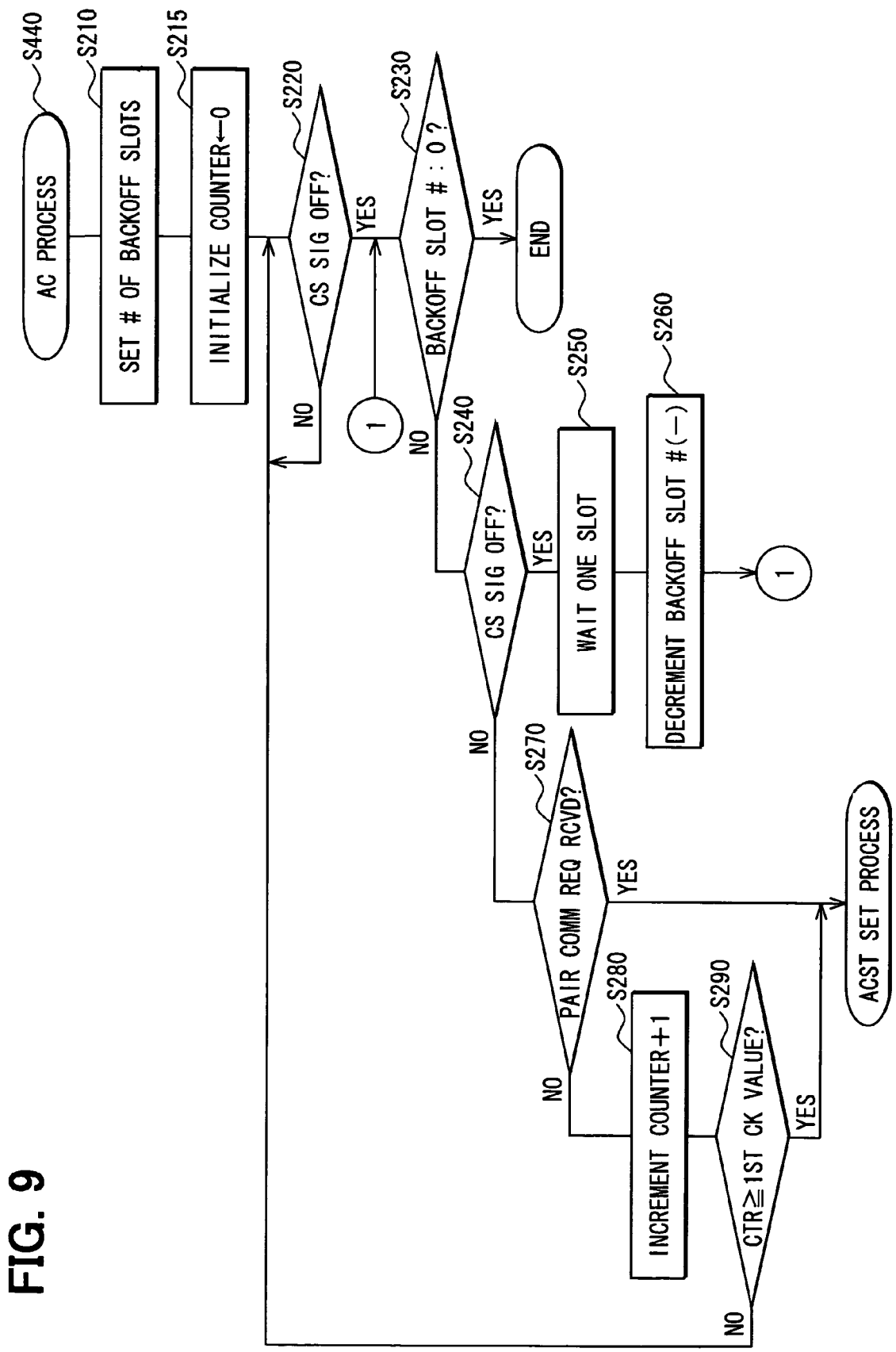
FIG. 9 shows a flowchart of the access control process in the second embodiment.

Namely, as shown in FIG. 9, in the access control process of the present embodiment, the number of backoff slots is set in Step S210. Subsequently, in Step S215, the received-transmission counter that counts the number of data packet transmissions made, during execution of the access control process, by other vehicles having obtained a right to transmit is initialized to 0. Processing then advances to Step S220.

When it is determined in Step S240 that the CS signal is not OFF, that is, in cases where a data packet has been received from another vehicle, processing advances to Step S270. In Step S270, whether or not a request to engage in pair communication was given to the own vehicle is determined. This is determined by checking whether or not the pair flag included in the surrounding vehicle information as shown in FIG. 7 and corresponding to the vehicle from which the last data packet was received was changed from OFF to ON during the received data process.

When it is determined in Step S270 that the own vehicle received a request to engage in pair communication, the access control process is halted and processing advances to Step S410 to perform the access control start time setting process. Conversely, when it is determined in Step S270 that the own vehicle received no request to engage in pair communication, processing advances to Step S280.

In Step S280, the number of data packets received from the surrounding vehicles (that is, the number of transmissions received from the surrounding vehicles) is updated by incrementing by one (+1) the count of the received-transmission counter initialized in Step S215. In Step S290, whether or not the count of the received-transmission counter exceeded a first check value preset to check the wireless channel congestion degree is determined.

When it is determined in Step S290 that the count of the received-transmission counter exceeded the first check value, it is determined that, with plural surrounding vehicles carrying out access control, competition for a right to transmit over the wireless channel is present and, as a result, the access control process performed by the own vehicle is halted. Processing then advances to Step S410 for the access control start time setting process. Conversely, when it is determined in Step S290 that the count of the received-transmission counter has not exceeded the first check value, processing skips to Step S220 to execute the subsequent steps again.

In other respects than described above, the access control process of the present embodiment is the same as the access control process of the first embodiment, so that it will not be described further here. In the access control process of the present embodiment, the processes executed in Steps S215, S280, and S290 are equivalent to the first determination unit of the present invention, and the process executed in Step S270 is equivalent to the third determination unit of the present invention.

Figure 10:
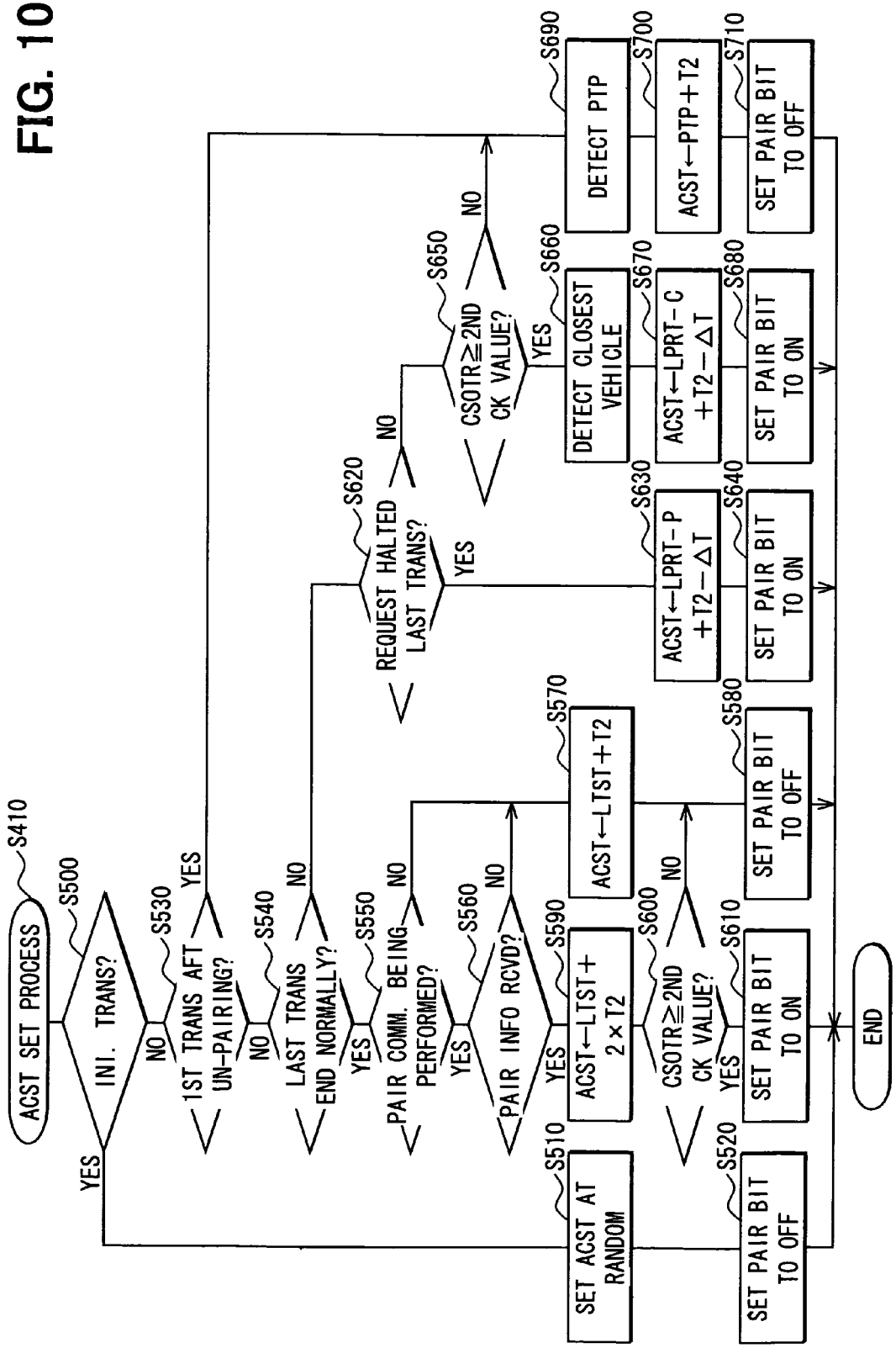
FIG. 10 shows a flowchart of access control start time setting process in the second embodiment.

FIG. 10 is a flowchart showing the access control start time setting process performed in Step S410.

As shown in FIG. 10, in the access control start time setting process of the present embodiment, it is first determined in Step S500 whether or not the current processing is the first processing to follow the startup of the communication device 10 (that is, whether or not the current processing is for an initial data packet transmission).

When it is determined in Step S500 that the current processing is for the initial data packet transmission, processing advances to Step S510. In Step S510, an access control start time (ACST) is determined by, as in Step S110 of the first embodiment, determining a random amount of time and adding the determined random amount of time to the current time. Processing then advances to Step S520.

In Step S520, pair information including a pair bit in an OFF state (set to 0) is set as the initial pair information to be provided for the data packet to be transmitted following the next access control, the initial pair information is written in the pair information storage area of the transmission packet storage device 14, and the process is then terminated for a current cycle of execution.

When it is determined in Step S500 that the current processing is not for the initial data packet transmission, processing advances to Step S530. In Step S530, it is determined whether or not the current processing is the first processing to be performed after the pair bit of the pair information was turned OFF and the counterpart vehicle was notified of the cancellation of pairing. When it is determined that the current processing is the first processing to be performed after the counterpart vehicle was notified of the cancellation of pairing, processing advances to Step S690 being described later. When it is determined that the current processing is the first processing to be performed after the counterpart vehicle was notified of the cancellation of pairing, processing advances to Step S540. In Step S540, it is determined whether or not a right to transmit was obtained normally by the last access control and the data packet was transmitted normally.

When it is determined in Step S540 that the last data packet transmission did not end normally, processing advances to Step S620. When it is determined in Step S540 that the last data packet transmission ended normally, processing advances to Step S550. In Step S550, whether or not pair communication is already being performed is determined by checking whether or not pair information including a pair bit in an ON state is currently included in the data packet to be transmitted.

When it is determined in Step S550 that pair communication is being performed, processing advances to Step S560. In Step S560, demodulation by the demodulator 20 of the transmission packet received from the communication device (that is, the counterpart device) 10 of the counterpart vehicle is awaited until a predetermined amount of time elapses from when the access control was started last and, when the received transmission packet is demodulated, it is checked if the transmission packet includes pair information specifying the own vehicle as the vehicle to engage in pair communication with the counterpart vehicle. This check is done based on the surrounding vehicle information updated by the received data process.

When it is determined in Step S560 that the transmission packet received from the counterpart vehicle includes pair information specifying the own vehicle as the vehicle to engage in pair communication with the counterpart vehicle, it is determined that the pair communication taking place between the counterpart vehicle and the own vehicle can be continued, and processing advances to Step S590. In Step S590, the next access control start time is set by adding two times a constant amount of time T2 (2×T2) to the time when, after a right to transmit was obtained last, a packet transmission was started last (Last transmission start time: LTST in S590).

After the next access control start time is set in Step S590, processing advances to Step S600. In Step S600, whether or not the wireless channel is in a state where, in terms of congestion, it is appropriate to continue the pair communication is determined. This is done by calculating the ratio (CS ON time ratio: CSOTR) of the time when the CS signal was ON to the total time from when the access control was started last to when a transmission packet was received last from the counterpart vehicle (the total time being approximately the same as the constant amount of time T2) and determining whether or not the CS ON time ratio is equal to or larger than a preset second check value.

When it is determined in Step S600 that the CS ON time ratio is equal to or larger than the second check value, it is determined that the pair communication is required to be continued and processing advances to Step S610. In Step S610, pair information including a pair bit in an ON state and the vehicle ID of the counterpart vehicle is written in the pair information storage area of the transmission packet storage device 14, and the process is then terminated once.

To calculate the CS ON time ratio, the ON time of the CS signal inputted from the comparator 24 to the microcomputer 30 may be counted. Since the data packets transmitted by individual vehicles have a same length (to take a same amount of packet transmission time), the CS ON time ratio can also be calculated by counting the number of pieces of surrounding vehicle information updated during one normal communication cycle in the received data process.

When it is determined in Step S550 that no pair communication is being performed, or when it is determined in Step S560 that the transmission packet received from the counterpart vehicle includes no pair information specifying the own vehicle as the vehicle to engage in pair communication with the counterpart vehicle, processing advances to Step S570 to proceed with ordinary/normal communication. In Step S570, the next access control start time is set by adding the constant amount of time T2 to the time when, after a right to transmit was obtained last, a packet transmission was started last (LTST in S570). Processing then advances to Step S580.

In Step S580, the pair information to be included in the data packet to be transmitted is updated by changing the pair bit of the pair information stored in the transmission packet storage device 14 from an ON state to an OFF state, then the process is terminated for the current cycle of execution. The process of Step S580 is performed also when it is determined in Step S600 that the CS ON time ratio is not larger than the second check value.

In Step S620, it is determined whether or not it was because the access control process was halted upon receipt of a request from another vehicle to engage in pair communication that the last data packet transmission did not end normally. When it is determined in Step S620 that the last data packet transmission was halted as a result of receiving a request from one of the surrounding vehicles to engage in pair communication, processing advances to Step S630; otherwise processing advances to Step S650.

In Step S630, the time that is reached when the constant amount of time T2 elapses from when the counterpart vehicle last started the data packet transmission is forecasted and the time thus forecasted is set as the next access control start time for the own vehicle. This forecast is done by reading, out of the surrounding vehicle information stored in memory, the time when the last packet reception from the counterpart vehicle, for which the pair flag is in an ON state, ended (Last packet reception end time from counterpart (i.e., pair) vehicle: LPRT-P) and adding the constant amount of time T2 less the time ΔT needed to transmit a data packet (T2−ΔT) to the time read out from memory.

In Step S640, the pair information including a pair bit in an ON state and the vehicle ID of the counterpart vehicle from which a request for engaging in pair communication was received is written in the pair information storage area of the transmission packet storage device 14, then the process is terminated once.

In Step S650, whether or not the wireless channel is in a state where, in terms of congestion, it is appropriate to start pair communication is determined. This is done, approximately the same as done in Step S600, by calculating the ratio (CS ON time ratio) of the time when the CS signal was ON to the length of an ordinary data packet transmission cycle (that is, to the last transmission period equal to the constant amount of time T2) and determining whether or not the CS ON time ratio is equal to or larger than the preset second check value. When it is determined in Step S650 that the CS ON time ratio is not larger than the second check value, processing advances to Step S690. When it is determined in Step S650 that the CS ON time ratio is equal to or larger than the second check value, processing advances to Step S660.

In Step S660, because pair communication is required to be started with the CS ON time ratio being equal to or larger than the second check value, the vehicle closest to the own vehicle is detected as the counterpart vehicle of pair communication based on the surrounding vehicle information updated during an ordinary data packet transmission cycle (that is, during the last transmission period equal to the constant amount of time T2) by the received data process.

In Step S670, the time when the closest vehicle (counterpart vehicle) thus detected will start the next access control is forecasted by adding the constant amount of time T2 less the time ΔT needed to transmit a data packet (T2−ΔT) to the time when reception of the data packet from the counterpart vehicle ended (Last packet reception end time from the closest vehicle: LPRT-C), then the time thus forecasted is set as the next access control start time for the own vehicle.

In Step S680, pair information including a pair bit in an ON state and the vehicle ID of the vehicle detected, in Step S660, as the counterpart vehicle of pair communication is generated, the generated pair information is written in the pair information storage area of the transmission packet storage device 14, then the process is terminated for the current cycle of execution.

In Step S690, based on the times when reception of the surrounding vehicle information updated by the received data process during an ordinary data packet transmission cycle (that is, during the last transmission period equal to the constant amount of time T2) ended, time periods during which no data packet transmission is performed by the surrounding vehicles (Packet transmittable period: PTP) are detected, and the longest one of the detected time periods is detected as a packet transmittable period.

In Step S700, the time determined by adding the constant amount of time T2 to the leading time of the packet transmittable period detected (PTP) in Step S690 is set as the next access control start time. In Step S710, the pair information to be included in the packet to be transmitted is updated by changing the pair bit of the pair information stored in the transmission packet storage device 14 from an ON state to an OFF state, then the process is terminated once.

As described above, in the access control start time setting process of the present embodiment, when it is found that the last access control process was halted halfway and the data packet to be transmitted was not transmitted, whether what caused the access control process to be halted was reception of a request for pair communication from one of the surrounding vehicles is determined (Step S620). When it is determined that what caused the access control process to be halted was not a request for pair communication, whether or not to perform pair communication is determined by checking if the CS ON time ratio is equal to or larger than the second check value (Step S650).

When it is not necessary to perform pair communication, it is assumed that there will be many vehicles performing access control at the last set access control start time, an unused time period in which competing with other vehicles for a right to transmit will not be necessary is detected, and the next access control start time is set to be in the detected time period (Step S700).

Thus, even after the last access control was halted as a result of determining that the wireless channel was congested, the communication device 10 of the present embodiment enables the next access control process to be started in a time period in which the wireless channel is not used. Once the access control start time is set in a time period in which the wireless channel is not used, the access control can subsequently be performed also in a time period in which the wireless channel is not used, so that data packets can be stably transmitted.

When it is determined in Step S650 that pair communication is to be performed with the CS ON time ratio being equal to or larger than the second check value, the vehicle closest to the own vehicle is selected as the counterpart vehicle of pair communication and the next access control start time of the own vehicle is set to be approximately the same as the access control start time of the closest vehicle (Step S670).

As a result, in the next access control, the own vehicle is caused to compete with the counterpart vehicle for a right to transmit. Once the own vehicle obtains a right to transmit and transmits a data packet to the counterpart vehicle, however, the pair information included in the transmitted packet requests the counterpart vehicle to start pair communication so that the two vehicles can engage in pair communication. In the pair communication, the own vehicle and the counterpart vehicle alternately obtain a right to transmit, each vehicle obtaining a right to transmit at a period approximately two times an ordinary period, so that they can stably exchange data packets without causing the wireless channel to be congested.

When the data packet transmission is completed by the access control started at the time set in Step S670, the time determined by adding two times the constant amount of time T2 (2×T2) to the last access control start time is set as the next access control start time (Step S590). When, on the other hand, it is determined in Step S620 that what caused the access control process to be halted was a request for pair communication received from one of the surrounding vehicles, the time determined by adding the constant amount of time T2 to the time when the counterpart vehicle last started the access control is set as the next access control start time (Step S630).

Thus, in the access control started at the time set in Step S630, the data packet can be transmitted without competing with the counterpart vehicle for a right to transmit. Moreover, the pair information included in the packet transmitted to the counterpart vehicle from which a request for pair communication was received serves to notify the counterpart vehicle that pair communication was started. Once pair communication is started, therefore, it can be stably continued.

Furthermore, while the pair communication is performed, the state of congestion of the wireless channel is monitored by checking whether or not the CS ON time ratio is equal to or larger than the second check value (Step S600). When it is determined based on the monitoring that the wireless channel is no longer congested, the pair bit included in the pair information is changed from an ON state to an OFF state to thereby direct the counterpart vehicle to terminate the pair communication (Step S580), then ordinary communication is resumed.

Thus, it is possible to perform pair communication only when the number of surrounding vehicles increases, for example, due to traffic congestion causing a remarkable increase in the data traffic over the wireless channel, while, in a normal situation, transmitting a data packet at a predetermined period which is set based on a constant amount of time T2.

In the present embodiment: the access control start time setting process is conceptually equivalent to the access time set unit of the present invention; the determination processes performed in Steps S600 and S650 of the access control start time setting process are equivalent to the second determination unit of the present invention; and the processes performed in Steps S660 and S560 are equivalent to the paired apparatus selection unit and the fourth determination unit of the present invention, respectively.

Also in the present embodiment, in addition to the transmission order signal output process performed in Step S450 shown in FIG. 8 and the transmission packet storage device 14, the processes performed, to write pair information in the transmission packet storage device 14, in Steps S520, S610, S580, S640, S680, and S710 are equivalent to the transmission control unit of the present invention.

The first and second embodiments to which the present invention is applied have been disclosed in the above description. However, the invention is not limited to the above embodiments, and the embodiments can be modified in various ways without departing from the scope and spirit of the invention.

For example, in the above embodiments, in setting the counterpart vehicle of pair communication in Step S660 of the access control start time setting process shown in FIG. 10, the vehicle closest to the own vehicle is detected based on the location information included in the vehicle information obtained from the surrounding vehicles and the closest vehicle detected is specified as the counterpart vehicle. A different arrangement may be made so that a vehicle running in the same direction and at approximately the same speed as the own vehicle is selected based on the speed information obtained from the surrounding vehicles and so that the selected vehicle is specified as the counterpart vehicle.

According to the above description of the access control process of the above embodiments, when the time during which the CS signal remains in an OFF state reaches the amount of time determined based on the number of backoff slots, a right to transmit is determined to have been obtained and a data packet transmission is started. As long as the access control is based on a CSMA system, it may use any of the p-persistent CSMA described above, CSMA/CA complying with the IEEE802.11 standard, and non-persistent CSMA.

Even though, in the second embodiment, a communication device which can realize all of the three inventions regarding three types of communication method has been described, the first claimed method of the invention may be excluded from the second embodiment by adopting an approach in which, as shown in FIG. 4A, the next access control start time is determined by adding a constant amount of time T1 (or two times T1 (i.e. 2×T1) for pair communication) to the time when the last access control was started.

The second embodiment may exclude the process for carrying out pair communication with another vehicle in a surrounding area while merely including an arrangement such that, when, in the access control process, the count of the received-transmission counter exceeds the first check value, the access control is halted and such that, in cases where the access control is halted, the next access control start time is set, in Steps S690 and S700 of the access control start time setting process, to be in a time period during which the wireless channel is not used. Or, conversely, without including such an arrangement, the second embodiment may include only the process for carrying out pair communication with another vehicle in a surrounding area. Namely, the second embodiment can be modified to realize the second method and the third method of the present invention individually to achieve desired objects of the present invention.

Furthermore, even though the above embodiments are based on cases in which the present invention is applied to a vehicle-mounted communication device for communication between vehicles, the invention can also be applied to a base station communication device or vehicle-mounted communication device for road-to-vehicle communication or a mobile communication device. Namely, the invention can be applied, to obtain effects similar to those of the above embodiments, to any wireless communication device which autonomously transmits a constant-length data packet at a predetermined period.

Such changes and modifications are to be understood as being within the scope of the present invention as defined by the appended claims.

What is claimed is:

1. A wireless communication method comprising:
performing, at an access control start time, an access control based on CSMA method that acquires a right to transmit by a carrier-sensing;
transmitting a data packet of a predetermined data length when the right to transmit is acquired by the access control;
calculating a data packet transmission time ratio for a purpose of determining whether the time ratio exceeds a second threshold, the time ratio being defined as a ratio of (a) a time when a data packet can be received from one other communication apparatus to (b) a fixed period of time;
selecting one of the other communication apparatuses that have transmitted a data packet during the fixed interval as a paired apparatus if the time ratio exceeds the second threshold;

determining an estimated time from a start of data packet transmission by the paired apparatus as a next access control start time of a subject apparatus until the right to transmit is acquired by the access control by calculating the next access control start time of the paired apparatus as the estimated time based on a data packet reception time of the data packet that has been transmitted by the paired apparatus;

instructing the paired apparatus to start a paired communication by adding pairing information indicating a start of the paired communication with the paired apparatus to the data packet when the data packet is transmitted after acquisition of the right to transmit by the access control started at the next access control start time that has been determined;

waiting thereafter for reception of the data packet from the paired apparatus, determining whether or not the pairing information indicative of performing a paired communication with the subject apparatus is included in the data packet when the data packet from the paired apparatus is received;

setting the access start time as the fixed interval from the start of previous data packet transmission by the subject apparatus if the pairing information is not included in the data packet from the paired apparatus;

performing the paired communication with the paired apparatus at the fixed interval by substantially doubling an initial fixed interval for an alternative acquisition of the right to transmit with the paired apparatus if the pairing information is included in the data packet from the paired apparatus;

if the data packet transmitted by the one of the other communication apparatuses includes the pairing information that indicates the paired communication between the subject apparatus and the other communication apparatus while the paired communication is not performed, identifying the one of the other communication apparatuses as the paired apparatus;

estimating a time after the fixed interval from a start of the data packet transmission by the identified paired apparatus as an estimated time based on a reception time of the data packet that have been transmitted by the identified paired apparatus for setting the estimated time as the next access control start time;

performing thereafter the paired communication by substantially doubling the fixed interval from the previous data packet transmission by the subject apparatus for setting the access control start time; and adding the pairing information to the data packet that is transmitted after identifying the paired apparatus while the paired communication is not performed.

2. The wireless communication method of claim 1, wherein
the wireless communication method is utilized for an exchange of information including positions of movable bodies among plural communication apparatuses that are disposed on the movable bodies,
the information includes a position of each of the movable bodies, and
when the time ratio exceeds the second threshold, a nearest communication apparatus to the subject apparatus is selected as the paired apparatus based on the positions of the movable bodies acquired from the other communication apparatuses that have transmitted the data packet during the fixed interval.

3. The wireless communication method of claim 2, wherein
a performance of the paired communication is notified to the paired apparatus by adding the pairing information to the data packet while the paired communication is performed,
the time ratio is calculated for determination whether the time ratio has decreased below the second threshold,
when the time ratio is determined to be smaller than the second threshold, the access control returns to the normal communication at a regular interval by canceling an addition of the pairing information to the data packet, and
when the data packet transmitted by the paired apparatus does not have an addition of the pairing information, the addition of the pairing information to the data packet is cancelled for returning the access control to the normal communication that is performed at the regular interval.

4. The wireless communication method of claim 2, wherein
while the paired communication is not performed, a time after a predetermined time from an acquisition of the right to transmit by the access control is set as the next access control start time.

5. The wireless communication method of claim 2, wherein
while the paired communication is not performed, one of a number of data packet transmission and a data packet transmission time by one other communication apparatus is counted by the carrier-sensing during the performance of the access control,
the currently executed access control is interrupted to detect a vacant time slot that can be used for a transmission of the data packet based on a reception condition of the data packet transmitted by the one other communication apparatus if one of the number of data packet transmission and the data packet transmission time exceeds a first threshold, and
a time after the fixed interval from a start of the vacant time slot is determined as the next access control start time.

6. The wireless communication method of claim 1, wherein
the wireless communication method is utilized for an exchange of information including speeds of movable bodies among plural communication apparatuses that are disposed on the movable bodies,
the information includes a speed of each of the movable bodies, and
when the time ratio exceeds the second threshold, a communication apparatus on a movable body that has a closest speed to the speed of the movable body having the subject apparatus is selected as the paired apparatus based on the speeds of the movable bodies acquired from the other communication apparatuses that have transmitted the data packet during the fixed interval.

7. The wireless communication method of claim 6, wherein
a performance of the paired communication is notified to the paired apparatus by adding the pairing information to the data packet while the paired communication is performed,
the time ratio is calculated for determination whether the time ratio has decreased below the second threshold,
when the time ratio is determined to be smaller than the second threshold, the access control returns to the normal communication at a regular interval by canceling an addition of the pairing information to the data packet, and when the data packet transmitted by the paired apparatus does not have an addition of the pairing information, the addition of the pairing information to the data packet is cancelled for returning the access control to the normal communication that is performed at the regular interval.

8. The wireless communication method of claim 6, wherein
while the paired communication is not performed, a time after a predetermined time from an acquisition of the right to transmit by the access control is set as the next access control start time.

9. The wireless communication method of claim 6, wherein
while the paired communication is not performed, one of a number of data packet transmission and a data packet transmission time by one other communication apparatus is counted by the carrier-sensing during the performance of the access control,
the currently executed access control is interrupted to detect a vacant time slot that can be used for a transmission of the data packet based on a reception condition of the data packet transmitted by the one other communication apparatus if one of the number of data packet transmission and the data packet transmission time exceeds a first threshold, and
a time after the fixed interval from a start of the vacant time slot is determined as the next access control start time.

10. The wireless communication method of claim 1, wherein
a performance of the paired communication is notified to the paired apparatus by adding the pairing information to the data packet while the paired communication is performed,
the time ratio is calculated for determination whether the time ratio has decreased below the second threshold,
when the time ratio is determined to be smaller than the second threshold, the access control returns to the normal communication at a regular interval by canceling an addition of the pairing information to the data packet, and
when the data packet transmitted by the paired apparatus does not have an addition of the pairing information, the addition of the pairing information to the data packet is cancelled for returning the access control to the normal communication that is performed at the regular interval.

11. The wireless communication method of claim 10, wherein
while the paired communication is not performed, a time after a predetermined time from an acquisition of the right to transmit by the access control is set as the next access control start time.

12. The wireless communication method of claim 10, wherein
while the paired communication is not performed, one of a number of data packet transmission and a data packet transmission time by one other communication apparatus is counted by the carrier-sensing during the performance of the access control,
the currently executed access control is interrupted to detect a vacant time slot that can be used for a transmission of the data packet based on a reception condition of the data packet transmitted by the one other communication apparatus if one of the number of data packet transmission and the data packet transmission time exceeds a first threshold, and
a time after the fixed interval from a start of the vacant time slot is determined as the next access control start time.

13. The wireless communication method of claim 1, wherein
while the paired communication is not performed, a time after a predetermined time from an acquisition of the right to transmit by the access control is set as the next access control start time.

14. The wireless communication method of claim 13, wherein
while the paired communication is not performed, one of a number of data packet transmission and a data packet transmission time by one other communication apparatus is counted by the carrier-sensing during the performance of the access control,
the currently executed access control is interrupted to detect a vacant time slot that can be used for a transmission of the data packet based on a reception condition of the data packet transmitted by the one other communication apparatus if one of the number of data packet transmission and the data packet transmission time exceeds a first threshold, and
a time after the fixed interval from a start of the vacant time slot is determined as the next access control start time.

15. The wireless communication method of claim 1, wherein
while the paired communication is not performed, one of a number of data packet transmission and a data packet transmission time by one other communication apparatus is counted by the carrier-sensing during the performance of the access control,
the currently executed access control is interrupted to detect a vacant time slot that can be used for a transmission of the data packet based on a reception condition of the data packet transmitted by the one other communication apparatus if one of the number of data packet transmission and the data packet transmission time exceeds a first threshold, and
a time after the fixed interval from a start of the vacant time slot is determined as the next access control start time.

16. A wireless communication apparatus comprising:
a transceiver unit capable of transmitting and receiving a data packet of a predetermined data length through a predetermined channel;
a carrier sense unit capable of detecting a reception of a transmission signal from at least one of other communication apparatuses by using the transceiver unit;
an access control start time set unit capable of periodically setting an access control start time;
an access control unit capable of performing an access control of CSMA method that acquires a right to transmit at the access control start time based on a detection signal from the carrier sense unit;
a transmission control unit capable of transmitting the data packet of the predetermined data length through the transceiver unit upon acquiring the right to transmit by the access control unit;
a second determination unit capable of determining whether a time ratio exceeds a second threshold the time ratio being defined as a ratio of (a) packet reception time for receiving the data packet from the at least one of the other communication apparatuses to (b) a predetermined fixed length of time; and
a paired apparatus selection unit capable of selecting, as a paired apparatus, one of the other communication apparatuses that have transmitted the data packet during the fixed interval if the second determination unit determines that the time ratio has exceeded the second threshold, wherein if the paired apparatus is selected by the paired apparatus selection unit, until the right to transmit is acquired by the access control unit, the access control start time set unit subsequently determines an estimated time from a start of data packet transmission by the paired apparatus as a next access control start time of a subject apparatus by calculating, as the estimated time, the next access control start time of the paired apparatus based on a data packet reception time of the data packet that has been transmitted by the paired apparatus and has been received by the transceiver unit, and, after the right to transmit has been acquired by the access control unit and the data packet has been transmitted by the transceiver unit, the access control start time set unit waits for reception of the data packet from the paired apparatus, determines whether or not pairing information indicative of performing a paired communication with the subject apparatus is included in the data packet when the data packet from the paired apparatus is received, sets the access start time as the fixed interval from the start of previous data packet transmission by the subject apparatus if the pairing information is not included in the data packet from the paired apparatus, performs the paired communication with the paired apparatus by using the access control unit with a setting of the next access control start time at substantially doubled fixed intervals for an alternative acquisition of the right to transmit with the paired apparatus if the pairing information is included in the data packet from the paired apparatus, the transmission control unit instructs the paired apparatus to start the paired communication by adding the pairing information indicative of performing the paired communication with the paired apparatus to the data packet when the data packet is transmitted by the transceiver unit with the right to transmit being acquired by the access control unit after selection of the paired apparatus by the paired apparatus selection unit, a third determination unit is provided to identify one of the other communication apparatuses as the paired apparatus when the data packet transmitted by the one of the other communication apparatuses and received by the transceiver unit is determined to include the pairing information that instructs the subject apparatus to start the paired communication with the one of the other communication apparatuses while the paired communication is not performed, the access control start time set unit estimates, as an estimated time, a time after the fixed interval from a start of the data packet transmission by the paired apparatus based on a data packet reception time of the data packet transmitted by the paired apparatus when the third determination unit identifies the paired apparatus, sets the estimated time as the next access control start time, and subsequently controls the access control unit to perform the paired communication at substantially doubled fixed intervals, and the transmission control unit adds the pairing information to the data packet transmitted after the identification of the paired apparatus by the third determination unit.

17. The wireless communication apparatus of claim 16, wherein
the wireless communication apparatus is installed on a movable body to be utilized for exchange of information that includes position information of the movable body with at least one of the other communication apparatuses on another movable body, and the paired apparatus selection unit selects, as the paired apparatus, a nearest wireless communication apparatus based on the position information acquired from the wireless communication apparatuses that have transmitted the data packet during the fixed interval.

18. The wireless communication apparatus of claim 17 further comprising:
a fourth determination unit capable of determining whether the data packet received by the transceiver unit through performance of the paired communication includes the pairing information, wherein
the transmission control unit notifies the paired apparatus of performance of the paired communication by adding the pairing information to the data packet when the paired communication is performed, and
when the paired communication is performed, the access control start time set unit sets the access control start time at a regular interval to make the access control unit return to the normal communication of access control at the regular interval when the fourth determination unit determines that the data packet from the paired apparatus does not include the pairing information during the performance of the paired communication or when the second determination unit determines that the time ratio is smaller than the second threshold.

19. The wireless communication apparatus of claim 17, wherein
the access control start time set unit sets, as the next access control start time, a time after a predetermined time from an acquisition of the right to transmit by the access control unit while the paired communication is not performed.

20. The wireless communication apparatus of claim 17 further comprising:
a first determination unit capable of interrupting the access control upon detecting by the carrier sense unit that one of a number of transmission signals and a transmission time of the transmission signal from the one of the other communication apparatuses exceeds a first threshold when the access control unit performs the access control during a paired communication non-performance time, wherein
when the first determination unit interrupts the access control, the access control start time set unit detects a vacant time slot that can be used to transmit the data packet based on a reception condition of the data packet transmitted from the one of the other communication apparatuses, and, sets, as the next access control start time, a time after the fixed interval from a start of the detected vacant time slot.

21. The wireless communication apparatus of claim 16, wherein
the wireless communication apparatus is installed on a movable body to be utilized for exchange of information that includes speed information of the movable body with at least one of the other communication apparatuses on another movable body, and the paired apparatus selection unit selects, as the paired apparatus, one of the other communication apparatuses installed on the movable body having a closest travel speed to the travel speed of the movable body with a subject wireless communication apparatus installed thereon based on travel speed information acquired from one of the other communication apparatuses that have transmitted the data packet during the fixed interval.

22. The wireless communication apparatus of claim 21 further comprising:

a fourth determination unit capable of determining whether the data packet received by the transceiver unit through performance of the paired communication includes the pairing information, wherein the transmission control unit notifies the paired apparatus of performance of the paired communication by adding the pairing information to the data packet when the paired communication is performed, and when the paired communication is performed, the access control start time set unit sets the access control start time at a regular interval to make the access control unit return to the normal communication of access control at the regular interval when the fourth determination unit determines that the data packet from the paired apparatus does not include the pairing information during the performance of the paired communication or when the second determination unit determines that the time ratio is smaller than the second threshold.

23. The wireless communication apparatus of claim 21, wherein the access control start time set unit sets, as the next access control start time, a time after a predetermined time from an acquisition of the right to transmit by the access control unit while the paired communication is not performed.

24. The wireless communication apparatus of claim 21 further comprising:

a first determination unit capable of interrupting the access control upon detecting by the carrier sense unit that one of a number of transmission signals and a transmission time of the transmission signal from the one of the other communication apparatuses exceeds a first threshold when the access control unit performs the access control during a paired communication non-performance time, wherein when the first determination unit interrupts the access control, the access control start time set unit detects a vacant time slot that can be used to transmit the data packet based on a reception condition of the data packet transmitted from the one of the other communication apparatuses, and, sets, as the next access control start time, a time after the fixed interval from a start of the detected vacant time slot.

25. The wireless communication apparatus of claim 16 further comprising:

a fourth determination unit capable of determining whether the data packet received by the transceiver unit through performance of the paired communication includes the pairing information, wherein the transmission control unit notifies the paired apparatus of performance of the paired communication by adding the pairing information to the data packet when the paired communication is performed, and when the paired communication is performed, the access control start time set unit sets the access control start time at a regular interval to make the access control unit return to the normal communication of access control at the regular interval when the fourth determination unit determines that the data packet from the paired apparatus does not include the pairing information during the performance of the paired communication or when the second determination unit determines that the time ratio is smaller than the second threshold.

26. The wireless communication apparatus of claim 25, wherein the access control start time set unit sets, as the next access control start time, a time after a predetermined time from an acquisition of the right to transmit by the access control unit while the paired communication is not performed.

27. The wireless communication apparatus of claim 25 further comprising:

a first determination unit capable of interrupting the access control upon detecting by the carrier sense unit that one of a number of transmission signals and a transmission time of the transmission signal from the one of the other communication apparatuses exceeds a first threshold when the access control unit performs the access control during a paired communication non-performance time, wherein when the first determination unit interrupts the access control, the access control start time set unit detects a vacant time slot that can be used to transmit the data packet based on a reception condition of the data packet transmitted from the one of the other communication apparatuses, and, sets, as the next access control start time, a time after the fixed interval from a start of the detected vacant time slot.

28. The wireless communication apparatus of claim 16, wherein the access control start time set unit sets, as the next access control start time, a time after a predetermined time from an acquisition of the right to transmit by the access control unit while the paired communication is not performed.

29. The wireless communication apparatus of claim 28 further comprising:

a first determination unit capable of interrupting the access control upon detecting by the carrier sense unit that one of a number of transmission signals and a transmission time of the transmission signal from the one of the other communication apparatuses exceeds a first threshold when the access control unit performs the access control during a paired communication non-performance time, wherein when the first determination unit interrupts the access control, the access control start time set unit detects a vacant time slot that can be used to transmit the data packet based on a reception condition of the data packet transmitted from the one of the other communication apparatuses, and, sets, as the next access control start time, a time after the fixed interval from a start of the detected vacant time slot.

30. The wireless communication apparatus of claim 16 further comprising:

a first determination unit capable of interrupting the access control upon detecting by the carrier sense unit that one of a number of transmission signals and a transmission time of the transmission signal from the one of the other communication apparatuses exceeds a first threshold when the access control unit performs the access control during a paired communication non-performance time, wherein when the first determination unit interrupts the access control, the access control start time set unit detects a vacant time slot that can be used to transmit the data packet based on a reception condition of the data packet transmitted from the one of the other communication apparatuses, and, sets, as the next access control start time, a time after the fixed interval from a start of the detected vacant time slot.

* * * * *